United States Patent
Dohi

(10) Patent No.: US 10,732,610 B2
(45) Date of Patent: Aug. 4, 2020

(54) INFORMATION PROCESSING TERMINAL, MANAGEMENT SYSTEM, AND CONTROL METHOD

(71) Applicant: CANON KABUSHIKI KAISHA, Tokyo (JP)

(72) Inventor: Makoto Dohi, Naka-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 289 days.

(21) Appl. No.: 15/353,583

(22) Filed: Nov. 16, 2016

(65) Prior Publication Data
US 2017/0139402 A1    May 18, 2017

(30) Foreign Application Priority Data

Nov. 18, 2015  (JP) .................... 2015-225807

(51) Int. Cl.
  *B33Y 50/00* (2015.01)
  *G05B 19/4099* (2006.01)
  *B29C 64/386* (2017.01)
  *G05B 19/418* (2006.01)
  *B33Y 50/02* (2015.01)

(52) U.S. Cl.
  CPC ........ *G05B 19/4099* (2013.01); *B29C 64/386* (2017.08); *B33Y 50/00* (2014.12); *B33Y 50/02* (2014.12); *G05B 19/4183* (2013.01); *G05B 2219/35134* (2013.01); *G05B 2219/49007* (2013.01); *Y02P 90/265* (2015.11)

(58) Field of Classification Search
  CPC ............................... B33Y 50/02; B29C 64/00
  See application file for complete search history.

(56) References Cited

U.S. PATENT DOCUMENTS

| | | | |
|---|---|---|---|
| 9,738,038 B2* | 8/2017 | Shim | H04N 1/00278 |
| 2006/0127153 A1* | 6/2006 | Menchik | B41J 2/175 400/62 |
| 2012/0092724 A1* | 4/2012 | Pettis | B29C 64/386 358/1.15 |
| 2014/0265049 A1* | 9/2014 | Burris | B23K 26/034 264/497 |
| 2014/0279177 A1* | 9/2014 | Stump | B33Y 50/00 705/26.4 |
| 2015/0283763 A1* | 10/2015 | Chi | G05B 15/02 700/119 |
| 2017/0123407 A1* | 5/2017 | Shiihara | B33Y 30/00 |

FOREIGN PATENT DOCUMENTS

| | | |
|---|---|---|
| JP | 2015-064729 A | 4/2015 |
| JP | 2015-085663 A | 5/2015 |
| WO | 2014/144630 A1 | 9/2014 |

* cited by examiner

*Primary Examiner* — Benjamin P Sandvik
(74) *Attorney, Agent, or Firm* — Canon U.S.A., Inc. IP Division

(57) ABSTRACT

An information processing terminal according to an exemplary embodiment of the present invention acquires information about an expendable part including a modeling material to be used in modeling by a control apparatus configured to model a three-dimensional object, and displays information about the number of objects that can be modeled in a form corresponding to a predetermined object by the control apparatus with the amount of the modeling material remaining in the expendable part corresponding to the acquired information and also displays information specifying the shape and size of the predetermined object.

11 Claims, 15 Drawing Sheets

FIG. 9

| EXPENDABLE PART INFORMATION TABLE | | |
|---|---|---|
| MANUFACTURER | MODEL NUMBER | INITIAL AMOUNT OF MODELING MATERIAL CONTAINED IN NEW EXPENDABLE PART |
| XYZ COMPANY | LMN | 10000mm |
| | OPQ | 30000mm |
| | RST | 50000mm |
| | STU | 200000mm |
| ABC COMPANY | I | 5000mm |
| | II | 1000mm |
| | III | 8000mm |
| | IV | 4000mm |
| 123 COMPANY | 1020 | 100000mm |
| | 3020 | 300000mm |
| | 5050 | 500000mm |
| | 7090 | 700000mm |

| TABLE FOR MODEL A OF XYZ COMPANY AND SAMPLE MODEL 1 ||||||
|---|---|---|---|---|---|
| SIZE | FILLING RATE | REQUIRED AMOUNT OF MODELING MATERIAL FOR MODELING (mm) ||||
| | | PLA | ABS | NYLON | ... |
| LARGE | 100% | 1500 | 1800 | 1300 | xxx |
| | 50% | 750 | 900 | 650 | yyy |
| | 20% | 300 | 360 | 260 | zzz |
| MEDIUM | 100% | 750 | 900 | 650 | LLL |
| | 50% | 375 | 450 | 325 | MMM |
| | 20% | 150 | 180 | 130 | NNN |
| SMALL | 100% | 300 | 360 | 260 | aaa |
| | 50% | 150 | 180 | 130 | bbb |
| | 20% | 60 | 72 | 52 | ccc |

1002

| TABLE FOR MODEL B OF XYZ COMPANY AND SAMPLE MODEL 1 ||||||
|---|---|---|---|---|---|
| SIZE | FILLING RATE | REQUIRED AMOUNT OF MODELING MATERIAL FOR MODELING (mm) ||||
| | | PLA | ABS | NYLON | ... |
| LARGE | 100% | 1600 | 1700 | 1500 | |
| | 50% | 800 | 850 | 750 | |
| | 20% | 320 | 340 | 300 | |
| MEDIUM | 100% | 800 | 850 | 750 | |
| | 50% | 400 | 425 | 375 | |
| | 20% | 160 | 170 | 150 | |
| SMALL | 100% | 320 | 340 | 300 | |
| | 50% | 160 | 170 | 150 | |
| | 20% | 64 | 68 | 60 | |

| TABLE FOR MODEL A OF XYZ COMPANY AND SAMPLE MODEL 2 |||||
|---|---|---|---|---|---|
| SIZE | FILLING RATE | REQUIRED AMOUNT OF MODELING MATERIAL FOR MODELING (mm) ||||
| | | PLA | ABS | NYLON | ... |
| LARGE | 100% | 1000 | 1200 | 800 | xxx |
| | 50% | 500 | 600 | 400 | yyy |
| | 20% | 200 | 240 | 160 | zzz |
| MEDIUM | 100% | 500 | 600 | 400 | LLL |
| | 50% | 250 | 300 | 200 | MMM |
| | 20% | 100 | 120 | 80 | NNN |
| SMALL | 100% | 200 | 240 | 160 | aaa |
| | 50% | 100 | 120 | 80 | bbb |
| | 20% | 40 | 48 | 32 | ccc |

1102

| TABLE FOR MODEL B OF XYZ COMPANY AND SAMPLE MODEL 2 |||||
|---|---|---|---|---|---|
| SIZE | FILLING RATE | REQUIRED AMOUNT OF MODELING MATERIAL FOR MODELING (mm) ||||
| | | PLA | ABS | NYLON | ... |
| LARGE | 100% | 1050 | 1100 | 900 | |
| | 50% | 525 | 550 | 450 | |
| | 20% | 210 | 220 | 180 | |
| MEDIUM | 100% | 525 | 550 | 450 | |
| | 50% | 260 | 275 | 225 | |
| | 20% | 105 | 110 | 90 | |
| SMALL | 100% | 210 | 220 | 180 | |
| | 50% | 105 | 110 | 90 | |
| | 20% | 42 | 44 | 36 | |

INFORMATION PROCESSING TERMINAL, MANAGEMENT SYSTEM, AND CONTROL METHOD

BACKGROUND OF THE INVENTION

Field of the Invention

The present disclosure relates to an information processing terminal, a management system, and a control method relating to displaying information about the remaining amount of a modeling material to be used in modeling by a three-dimensional (3D) printer.

Description of the Related Art

In recent years, use of three-dimensional (3D) printers has been spreading rapidly. A 3D printer is a generic term for control apparatuses configured to model a three-dimensional object, which is a solid object. The technology relating to 3D modeling is also called additive manufacturing.

Although 3D printers have been used, they have rarely been put in the general market because most of them are large apparatuses for business use, highly specialized, and very expensive. However, recent technological advancements have enabled reduction in housing size and improvement in software operability, and less expensive 3D printers have been developed and can be used by general consumers. Further, 3D printers for business use have improved in performance and decreased in costs compared with conventional printers, so that many manufacturers now use 3D printers in the manufacture of prototypes and product parts.

Examples of modeling methods of three-dimensional printers include fused deposition modeling (FDM), stereo lithography (STL), selective laser sintering (SLS), and an inkjet method. Various types of materials are employed for modeling according to the respective modeling methods corresponding to the 3D printer model or the purpose of use of an object to be modeled. Examples of expendable parts for replenishing a 3D printer with a modeling material include a dedicated cartridge including a mechanism for outputting a modeling material, a filament modeling material wound around a core, and a container containing a liquid or powder modeling material.

3D printers generally include one to three print heads for outputting modeling materials. However, there are cases where the number of types of basic materials and colors of modeling materials that can be used in a single 3D printer is larger than the number of print heads. Accordingly, for example, in a case where the types of modeling materials to be used for an object are different from the types of modeling materials that are currently set to a 3D printer to be usable, a user needs to replace an expendable part before the modeling is carried out.

Japanese Patent Application Laid-Open No. 2015-64729 discusses a printing apparatus configured to perform printing on tapes. The printing apparatus presents a display to prompt a user to replace a consumable tape currently attached to the printing apparatus with another consumable tape when a print job cannot be executed due to a shortage in the remaining amount of the tape.

In the cases of the foregoing conventional techniques and the like, a plurality of replaced expendable parts that still include a usable modeling material may remain in user's hand. When a user is to model an object using such a replaced expendable part that still includes a usable modeling material, it is difficult for the user to intuitively grasp an object that can be modeled with the remaining amount of the modeling material. For example, in a case where "500 cm" of a modeling material in the form of a filament remains in an expendable part, it is difficult for the user to grasp the size and number of objects that can be modeled with the remaining amount of the modeling material. Further, Japanese Patent Application Laid-Open No. 2015-64729 described above does not consider a configuration of providing the user with information about a printing product that can be printed with a remaining amount of a tape in the expendable part that the printing apparatus prompts the user to replace.

SUMMARY OF THE INVENTION

The present disclosure is directed to a technique for displaying information about the remaining amount of a modeling material corresponding to a expendable part including the modeling material for use in the modeling by a control apparatus configured to model a three-dimensional object to make it easy for a user to grasp an object that can be modeled with the remaining amount of the modeling material corresponding to the expendable part.

According to an aspect of the present disclosure, an information processing terminal includes a processor, and a memory storing an application program which, when executed by the processor, causes the information processing apparatus to acquire information about an expendable part including a modeling material to be used in modeling by a control apparatus configured to model a three-dimensional object; and display: information about the number of objects that can be modeled in a form corresponding to a predetermined object by the control apparatus with a remaining amount of the modeling material of the expendable part corresponding to the acquired information and information specifying a shape and a size of the predetermined object.

Further features of the present disclosure will become apparent from the following description of exemplary embodiments with reference to the attached drawings.

BRIEF DESCRIPTION OF THE DRAWINGS

FIG. 9 illustrates an example of an expendable part information table.

FIG. 10 illustrates an example of a table in which an amount of a modeling material required for the modeling of each sample model is stored for each 3D printer model.

FIG. 11 illustrates an example of a table in which an amount of a modeling material required for the modeling of each sample model is stored for each 3D printer model.

DESCRIPTION OF THE EMBODIMENTS

Various exemplary embodiments, features, and aspects of the disclosure will be described in detail below with reference to the drawings.

Figure 1:
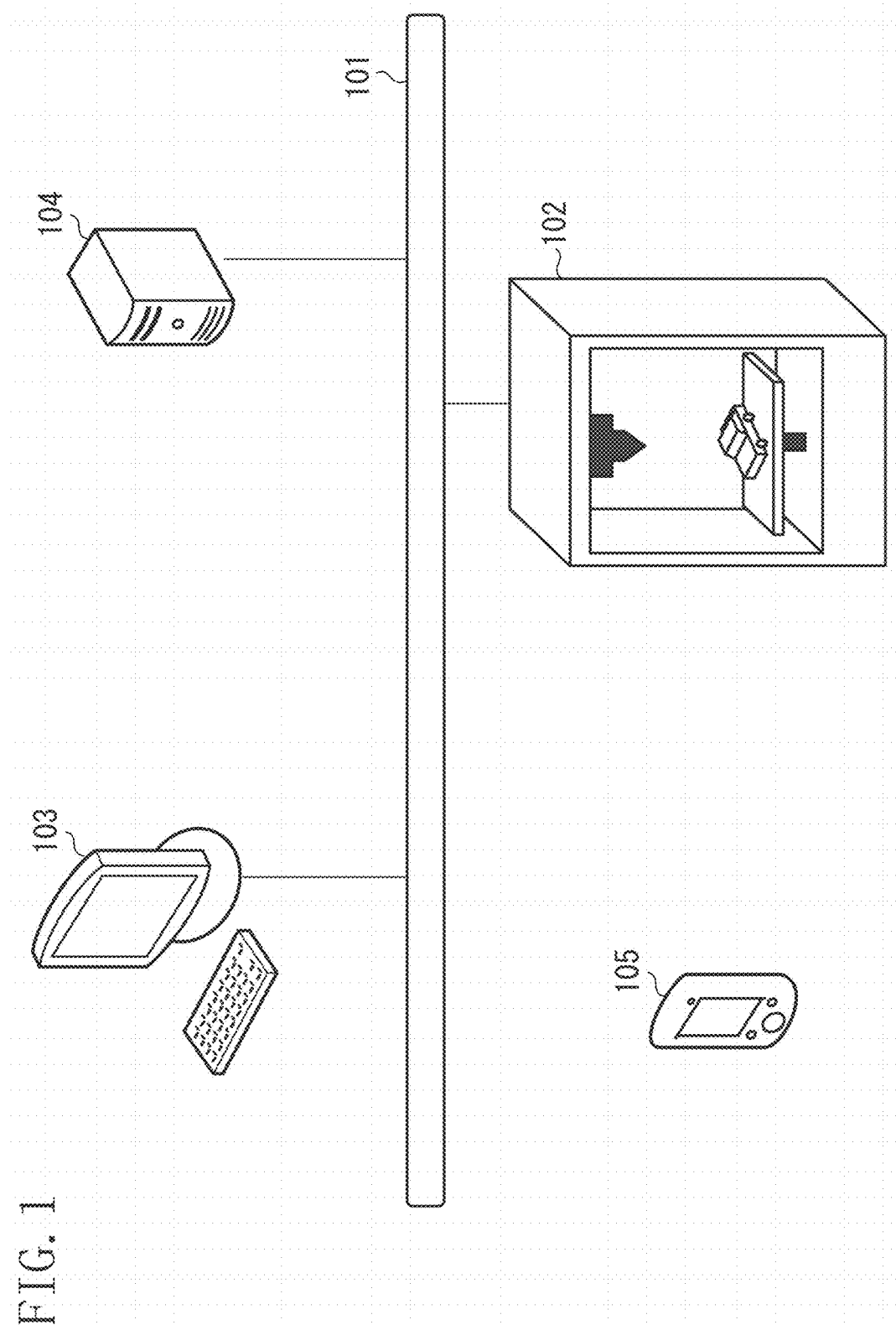
FIG. 1 illustrates an example of a system configuration and a network configuration according to an exemplary embodiment.

FIG. 1 illustrates an example of a system configuration and network configuration.

A network 101 is an intranet, a local area network (LAN), etc. A three-dimensional (3D) printer 102 is an example of a control apparatus configured to model a three-dimensional object, which is a solid object. A computer 103 is a client computer in which modeling control software for instructing the 3D printer 102 to perform modeling is installed.

A server 104 is a server computer including a function as a management apparatus configured to manage the 3D printer 102 and expendable parts. Further, the function of the server 104 may be realized on a virtual machine serving as a resource provided by a cloud service that can use a server computer on the Internet. The virtual machine refers to a logical computer realized by dividing a server computer into logical units independently of the physical configuration of the server computer through virtual technology so that each of the logical units includes an independent operating system to operate. A plurality of servers 104 may be used. A smartphone 105 is an information processing terminal including a function of contactless wireless communication such as near-field communication (NFC).

The 3D printer 102, the computer 103, and the server 104 can transmit and receive data to and from one another via the network 101. The network 101 may be a wireless network such as a wireless LAN. Further, the network 101 may be a public network such as the Internet via which data can be transmitted and received. The smartphone 105 can connect to a predetermined network to communicate with the 3D printer 102, the computer 103, the server 104, etc. The management system according to the present exemplary embodiment includes at least the server 104 and the smartphone 105.

Figure 2A:
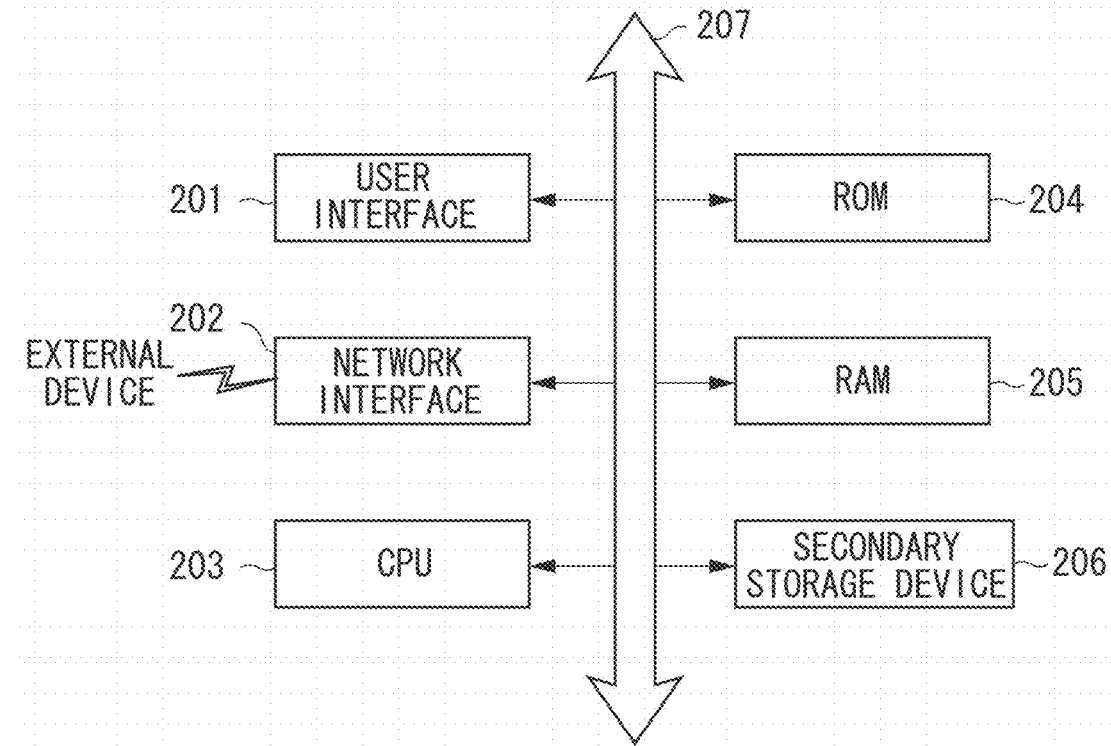
FIGS. 2A and 2B each illustrate an example of a hardware configuration.

FIG. 2A illustrates an example of the hardware configuration of an information processing apparatus. The information processing apparatus according to the present exemplary embodiment corresponds to a built-in computer built in the 3D printer 102, the computer 103, and the server 104.

A user interface (hereinafter referred to as "UI") 201 inputs and outputs information and signals to and from a display, a keyboard, a mouse, a touch panel, a button, etc. A computer without the foregoing hardware devices may be connected and operated from another computer using a remote desktop, a remote shell, etc.

A network interface 202 connects to a network such as a LAN and communicates with another computer or a network device. Embedded programs and data are recorded on a read-only memory (ROM) 204. A random access memory (RAM) 205 is a temporary memory area. A secondary storage device 206 is a hard disk drive (HDD), a flash memory, etc. A central processing unit (CPU) 203 executes a program read from the ROM 204, the RAM 205, the secondary storage device 206, etc. The foregoing units 201 to 206 are connected together via an internal bus 207.

The 3D printer 102 further includes a hardware configuration based on a modeling method. More specifically, the hardware configuration based on the modeling method is an engine unit of the 3D printer 102. The engine unit includes a CPU and a storage device such as a ROM and a RAM and further includes hardware, based on the modeling method, controlled by the CPU. For example, in a case of fused deposition modeling (FDM), the hardware is a print head (head, extruder), a motor configured to drive a stage and the print head in X-, Y-, and Z-axes directions, a heater configured to heat a nozzle of the print head, a fan for cooling, supplying air, and discharging air. Examples of other modeling methods include stereo lithography (STL), selective laser sintering (SLS), and an inkjet method.

Further, the 3D printer 102 includes a communication function (not illustrated) for transmitting and receiving data to and from an integrated circuit (IC) chip, etc. The 3D printer 102 can write information about the amount of use of a modeling material to the IC chip of an expendable part (described below with reference to FIG. 3). Further, the 3D printer 102 may write information about the remaining amount of the modeling material to the IC chip.

Figure 2B:
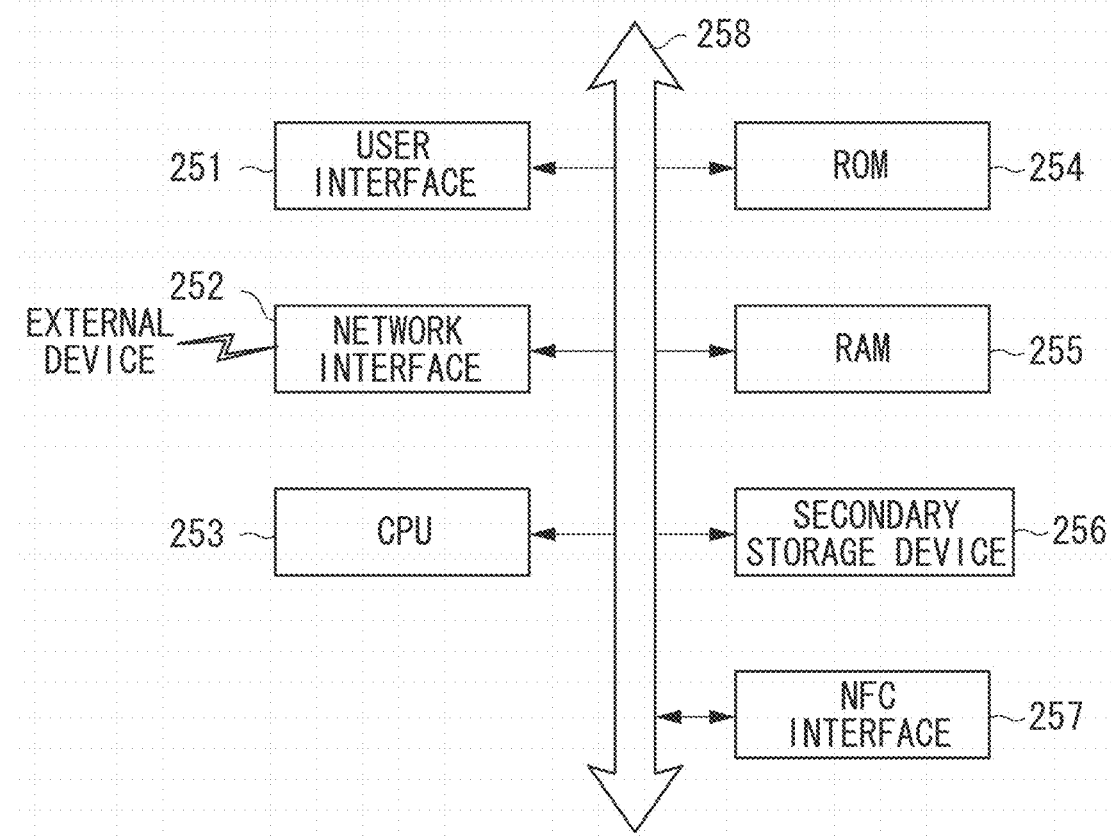

FIG. 2B illustrates an example of the hardware configuration of an information processing terminal. The information processing terminal according to the present exemplary embodiment corresponds to the smartphone 105.

A UI 251 inputs and outputs information and signals with a display, a touch panel, a button, etc.

A network interface 252 connects to a network such as a mobile phone communication network or a LAN to communicate with the computer 103, other computers, and other network devices. Embedded programs and data are recorded on a ROM 254. A RAM 255 is a temporary memory area. A secondary storage device 256 is a flash memory, etc. A CPU 253 executes a program read from the ROM 254, the RAM 255, the secondary storage device 256, etc. An NFC interface 257 performs NFC communication with the IC chip of the expendable part (described below with reference to FIG. 3), etc. The foregoing units 251 to 257 are connected together via an internal bus 258.

Further, the smartphone 105 may store an application program downloaded from the server 104 on the secondary storage device 256 and executes the application program.

Figure 3:
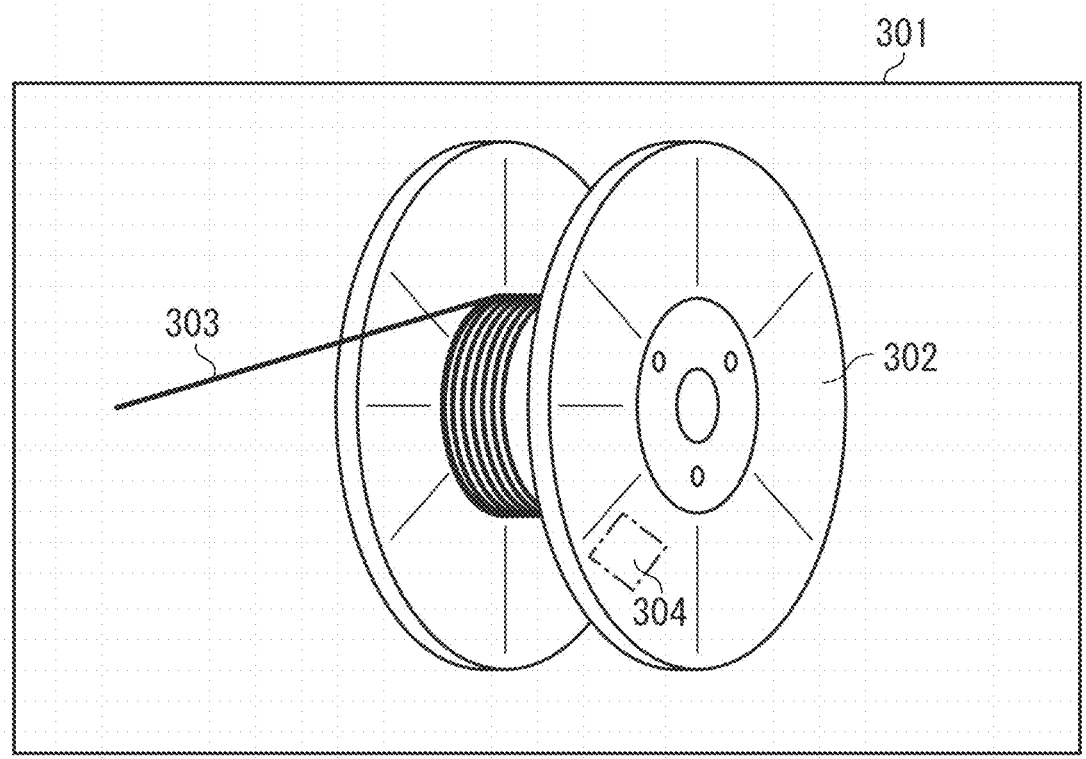
FIG. 3 illustrates an example of an expendable part.

FIG. 3 illustrates a form of the expendable part including a modeling material for use in the modeling of an object by the 3D printer 102.

A expendable part 301 includes a core 302 and a modeling material 303 in the form of a filament wound around the core 302 and replenishes the 3D printer 102 with the modeling material 303.

Further, an IC chip 304 embedded in the core 302 includes a function as a readable/writable non-volatile memory such as a flash memory and a function of contactless wireless communication such as NFC. Besides NFC, as the function of contactless wireless communication, Bluetooth low energy (BLE) may be used to output beacon signals containing information recorded on the memory.

The IC chip 304 stores therein expendable part identification information. The IC chip 304 further stores therein information about, for example, the amount of use of the modeling material, which is written by the 3D printer 102. The amount of use of the modeling material that is stored is a cumulative amount of the modeling material used in the corresponding expendable part. Further, information about the remaining amount of the modeling material that is written by the 3D printer 102 may also be stored on the IC chip 304.

While the expendable part 301 according to the present exemplary embodiment has such a form that the filament-shaped modeling material 303 is wound around the core 302, any form of a expendable part that includes the function of the IC chip 304 may be employed. Examples of other forms of an expendable part include a dedicated cartridge that includes mechanism for outputting a modeling material and a container in which a liquid or powder modeling material is stored.

Examples of modeling materials include acrylonitrile-butadiene-styrene (ABS), polylactic acid (PLA), nylon, and polyethylene terephthalate (PET). Further, a water-soluble dedicated modeling material may be used for a support structure that is modeled as required as a support in the modeling of an object. The foregoing examples are examples of modeling materials for use in FDM modeling, and another modeling material is used in the case of another modeling method. Examples of modeling materials for use in the inkjet method modeling include light curable resin and wax. Examples of modeling materials for use in SLS modeling include powder nylon and powder metal. Examples of modeling materials for use in STL modeling include special light curing resin. Further, there exists a 3D printer that performs modeling using as a modeling material a special powder such as plaster and an adhesive.

Figure 4:
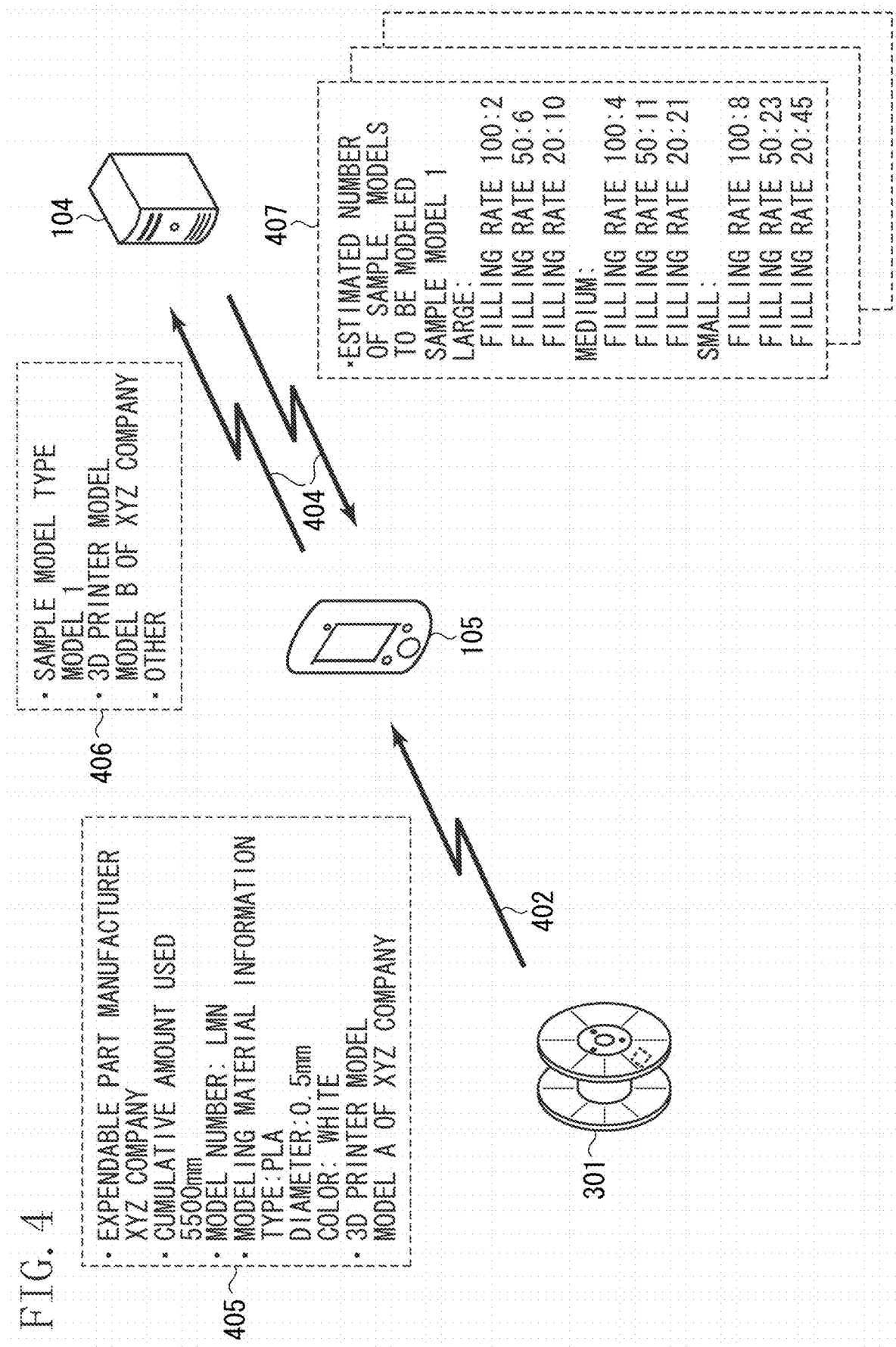
FIG. 4 illustrates an example of data communication in a system.

FIG. 4 illustrates an example of data communication in the system.

Figure 7A:
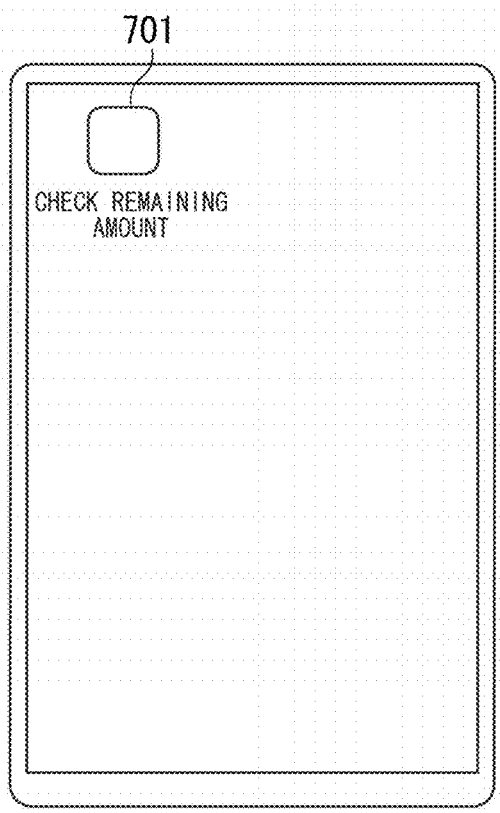
FIGS. 7A, 7B, and 7C each illustrate an example of a display screen user interface (UI) of a smartphone.

Communication 402 between the smartphone 105 and the IC chip 304 of the expendable part 301 is contactless communication performed using an NFC interface. Details of information 405 transmitted and received in the communication 402 will be described below with reference to FIGS. 7A, 7B, and 7C.

The smartphone 105 and the server 104 are connected together to communicate with each other, and communication 404 between the smartphone 105 and the server 104 is performed using a public line such as a mobile phone communication network (third generation (3G), fourth generation (4G), 4G Long-Term Evolution (4G LTE)) or the network 101. Details of information 406 and information 407 that are transmitted and received in the communication 404 will be described below with reference to FIG. 7C.

Figure 5:
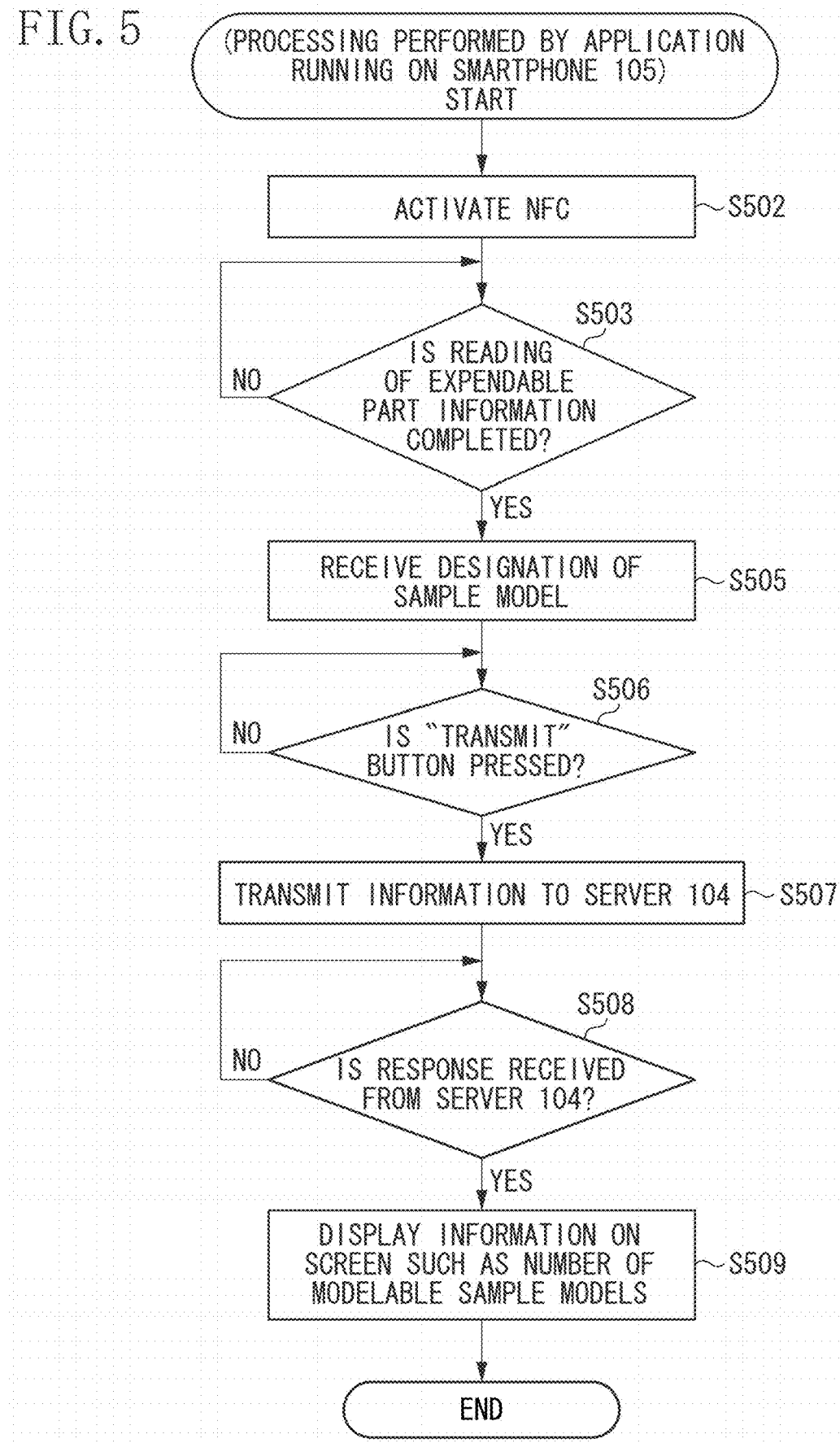
FIG. 5 is a flow chart illustrating an example of a process performed by an application running on a smartphone.

FIG. 5 is a flow chart illustrating an example of a process performed by an application running on the smartphone 105. The CPU 253 executes a program copied from the ROM 254 or the secondary storage device 256 onto the RAM 255 to perform the process to be executed on the smartphone 105.

First, an application program (hereinafter, "application") for executing the process on the smartphone 105 is activated. For example, an icon of the application is displayed on a screen of the smartphone 105. For example, a user operating the smartphone 105 selects an icon 701 of "check remaining amount" illustrated in FIG. 7A to activate the application. A method for installing the application into the smartphone 105 includes downloading the application from the server 104. Alternatively, the application may be stored on the IC chip 304 of the expendable part 301, and the smartphone 105 may read and download the application from the IC chip 304.

In step S502, the application activates the NFC interface 257 and prepares to read and acquire information from the IC chip 304 of the expendable part 301.

Figure 7B:
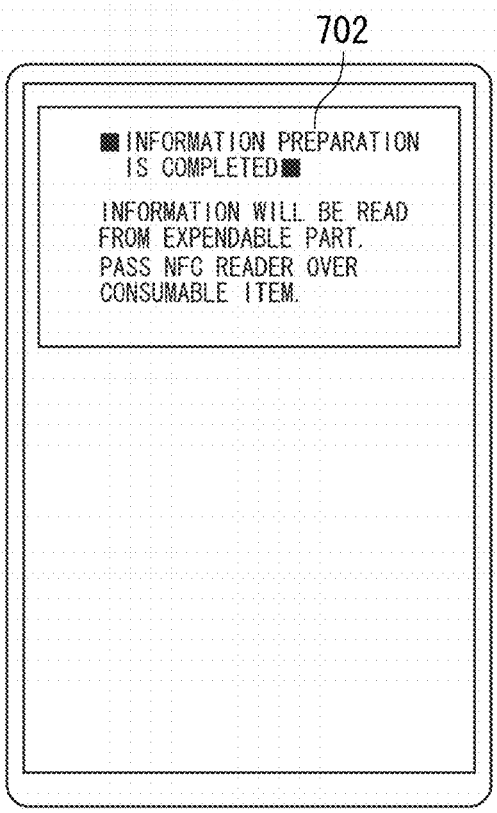

A screen UI displayed at this time on the smartphone 105 is illustrated in FIG. 7B. A message is displayed to prompt the user operating the smartphone 105 to cause the smartphone 105 to read information about the expendable part 301. Instead of reading information from the IC chip 304 of the expendable part 301, the user may input identification information about the expendable part 301, etc. using a screen UI (not illustrated).

In step S503, the application determines whether the reading of the information from the IC chip 304 of the expendable part 301 is completed. If the reading is completed (YES in step S503), the processing proceeds to step S505. In step S505, the application receives designation of a sample model.

In the present exemplary embodiment, the sample model refers to a predetermined object that is used to calculate the number of objects that can be modeled with the remaining amount of a modeling material of a expendable part. The amount of a modeling material required for the modeling varies depending on the shape and size of the object. Further, the amount of a modeling material required for the modeling also varies depending on the model of the 3D printer 102 and modeling settings for the 3D printer 102. Thus, by the user designating as a sample model an object having a shape similar to the shape of an object that the user is to model, from a plurality of candidate objects, the user can intuitively recognize with ease an object which can be modeled with the remaining amount of a modeling material. Further, the candidate objects are different in either object shape or object size.

In the foregoing example, the user designates only the shape of the sample model, so that a response from the server 104 contains information about the number of the sample models that can be modeled for each size. The user may designate the shape and size of a sample model at the same time when designating the sample model, and the designation information may be transmitted to the server 104.

Here, the application displays on the screen of the smartphone 105 information specifying the status of use of the expendable part 301, etc. based on the information read from the IC chip 304 of the expendable part 301. Further, a screen for prompting the user to check whether the displayed information needs to be corrected may be displayed. The data read from the IC chip 304 may be coded or encrypted, and the application may display information acquired by converting the data.

Figure 7C:
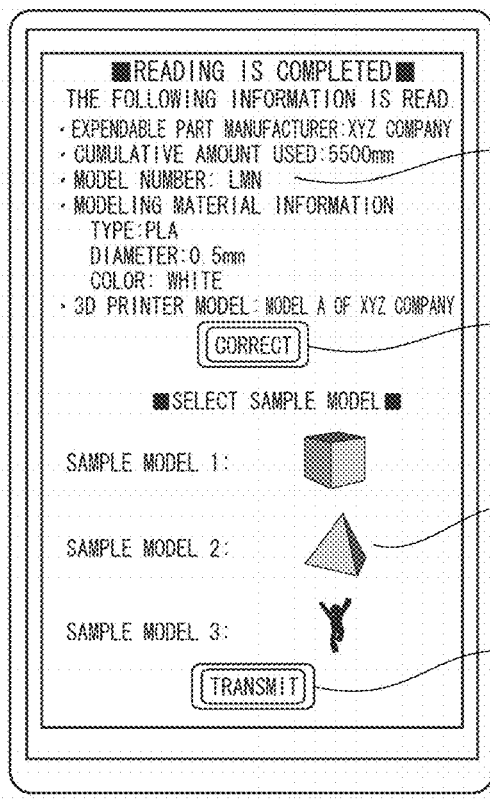

FIG. 7C illustrates a screen UI to be displayed on the smartphone 105. Display item 703 is based on the information read from the IC chip 304 of the expendable part 301. The information read from the IC chip 304 contains "expendable part manufacturer: XYZ company," "cumulative amount used: 5500 mm," "model number: LMN," "modeling material information: PLA (polylactic acid), diameter: 0.5 mm, color: white," and "3D printer model: model A of XYZ company." The foregoing pieces of information are the same as contents of the information 405 in FIG. 4. In a case where information about the amount of a usable modeling material remaining in the expendable part 301 is successfully read from the IC chip 304, this information about the remaining amount may be displayed instead of the information about the cumulative amount used. Further, in a case where both the information about the amount of the usable modeling material remaining in the expendable part 301 and the information about the cumulative amount used are successfully read from the IC chip 304, both or either one may be displayed.

To correct the read information, the user selects a "correct" button 704. When the "correct" button 704 is selected, the screen moves to a correction screen (not illustrated) to enable correction of the read information. For example, the user changes the model of the 3D printer to execute the modeling from "model A of XYZ company" to "model B of XYZ company".

An image 705 is an image representing sample models that can be selected. The user selects a sample model from the sample models displayed in the image 705 and then presses a "transmit" button 706. One or a plurality of sample models may be selected from the list of sample models displayed in the image 705. Further, a sample model may be designated in advance in the server 104.

In step S506, the application determines whether the "transmit" button 706 is pressed. If the "transmit" button 706 is pressed (YES in step S506), the processing proceeds to step S507. Alternatively, the processing may proceed to step S507 when the user selects one sample model.

In step S507, the application transmits to the server 104 the information read from the IC chip 304 of the expendable part 301 or its corrected information and the information about the sample model selected in step S505. In the present exemplary embodiment, "sample model 1" is selected in step S505. The information 406 in FIG. 4 also indicates that various types of information such as the sample model are transmitted to the server 104.

Next, in step S508, the application determines whether a response is received from the server 104. If a response is received from the server 104 (YES in step S508), then in step S509, the application displays on the screen of the smartphone 105 information based on the response received from the server 104.

Figure 8A:
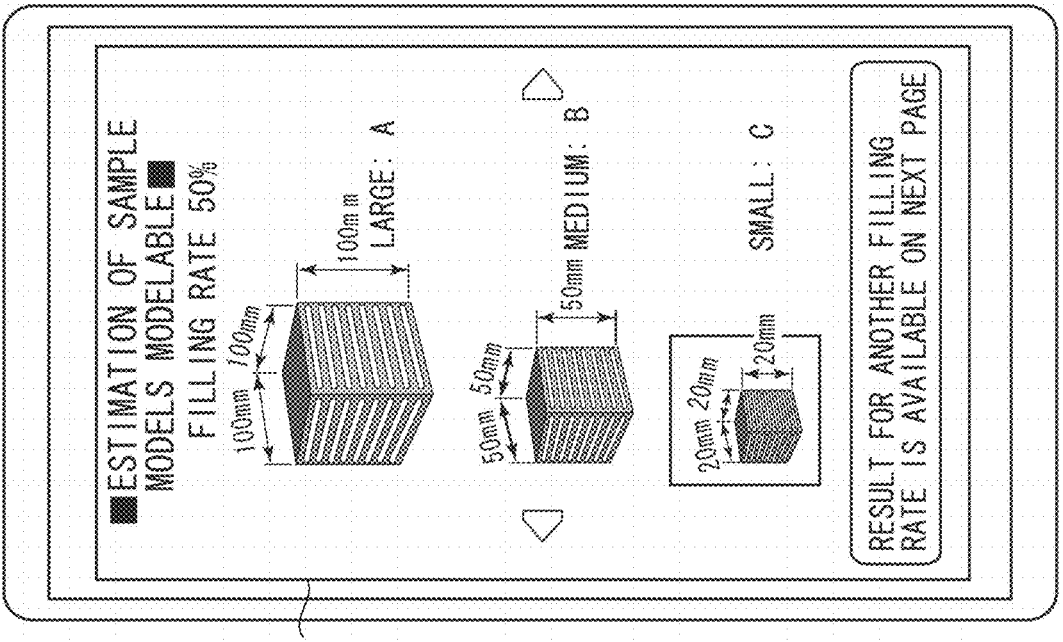
FIGS. 8A and 8B each illustrate an example of a display screen UI of a smartphone.

FIG. 8A illustrates a screen UI displayed in step S509. FIG. 8A is a screen UI that is displayed in a case where "sample model 1" is selected as a sample model in step S505. A screen UI 807 in FIG. 8A specifies for each of large/medium/small sizes of "sample model 1" the number of the sample models that can be modeled (modelable) with the amount of the modeling material remaining in the expendable part 301. In this example, a filling rate is 100%. The filling rate refers to a filling density of an object.

Figure 8B:
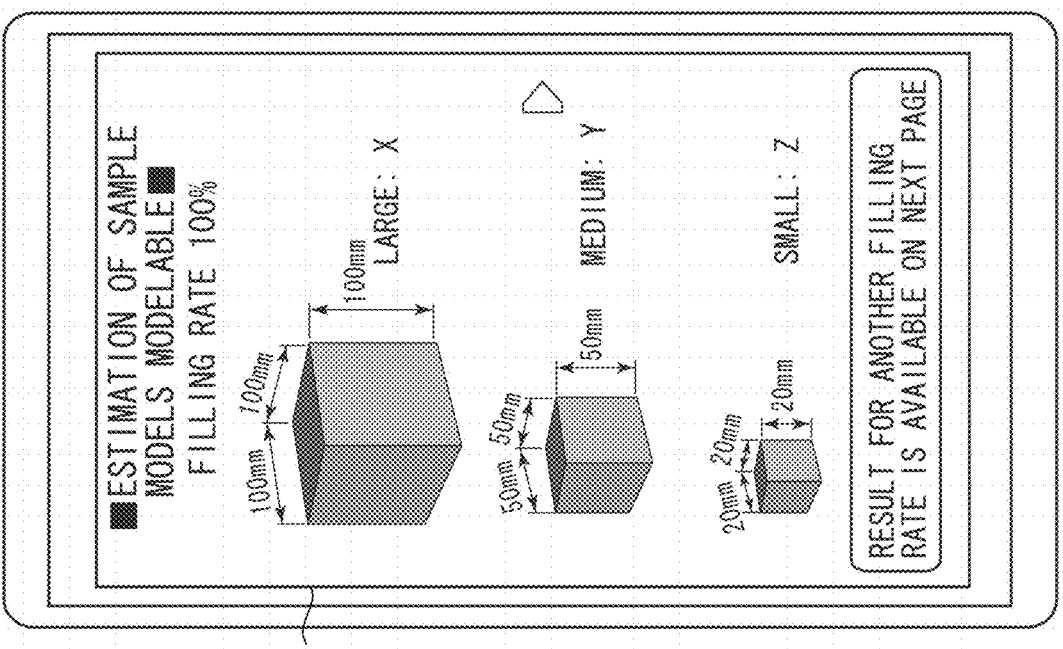

Further, when the screen UI 807 is moved laterally, the smartphone 105 displays information about the number of the modelable sample models in the case of the same sample model at a different filling rate. An example of a screen UI displayed at this time is illustrated in FIG. 8B. A screen UI 808 displays for each of large/medium/small sizes of "sample model 1" the number of the sample models modelable with the amount of the modeling material remaining in the expendable part 301 in the case of the filling rate of 50%.

When the screen UI 808 is further moved laterally, the smartphone 105 displays a screen (not illustrated) displaying for each of large/medium/small sizes of "sample model 1" the number of the sample models that can be modeled in the case of another filling rate, e.g., 20%.

Figure 15B:
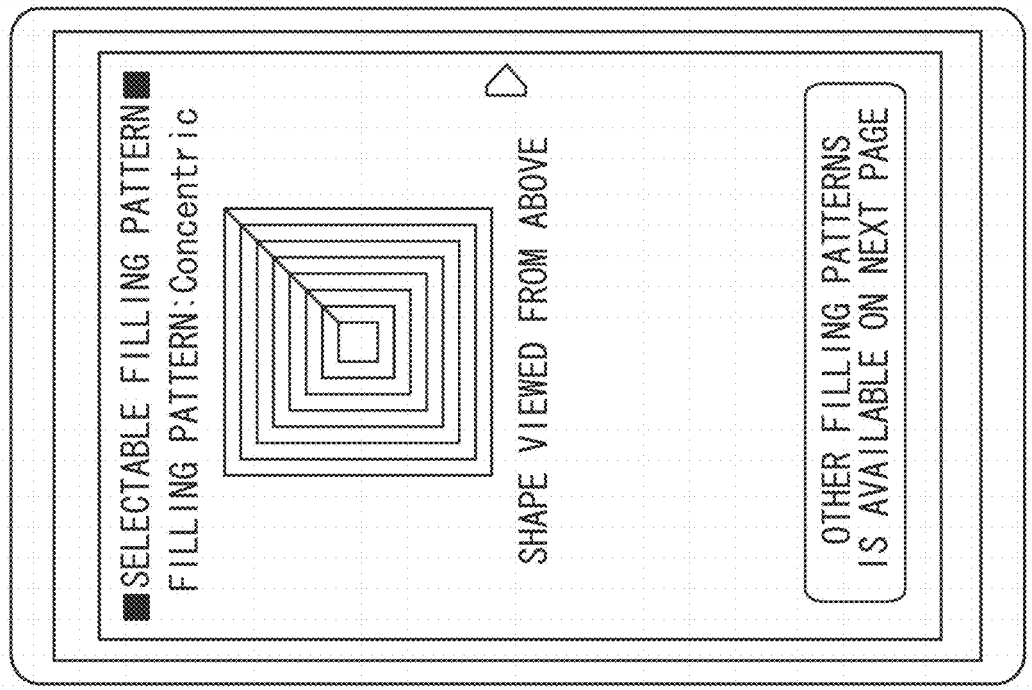
FIGS. 15A and 15B each illustrate an example of a filling pattern display screen UI.
Figure 15A:
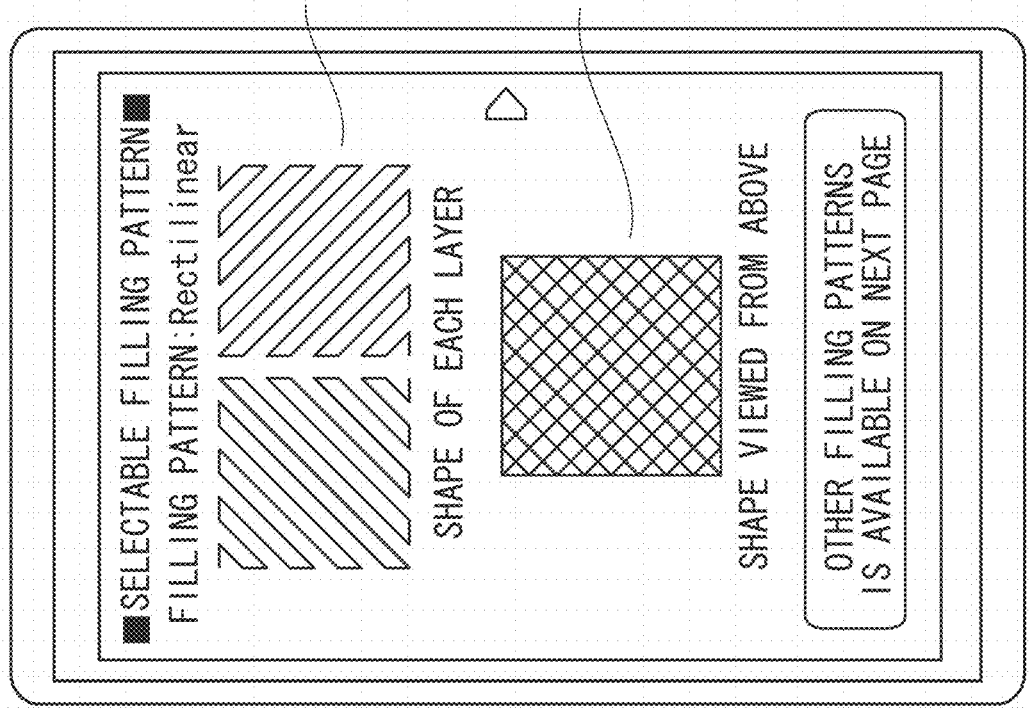

Further, when the screen is moved laterally, a case of not another filling rate but another filling pattern may be displayed. The filling pattern refers to an internal structure of an object. The filling pattern is determined based on the shape of each layer of the object. Specific examples are illustrated in FIGS. 15A and 15B (described below). In the present exemplary embodiment, the filling pattern is designated in advance by the user. The filling pattern may be designated by the user at the time of reading the information from the IC chip 304, at the time of designating a sample model, etc. Screen UIs for selecting a filling pattern are illustrated in FIGS. 15A and 15B.

For example, FIG. 15A illustrates a screen for selecting a rectilinear filling pattern. In the rectilinear filling pattern, each layer is modeled alternately with two patterns 1501. Consequently, the shape viewed from above becomes a pattern as illustrated as a pattern 1502. Further, FIG. 15B illustrates a screen for selecting a concentric filling pattern. In the concentric filling pattern, every layer has the same shape, so only the shape viewed from above is displayed.

The filling rate and filling pattern settings may be predetermined by the user or the server 104.

The images of "sample model 1" displayed on the screen UI 807, etc., the information about the number of the sample models that can be modeled, the filling pattern selection screens illustrated in FIGS. 15A and 15B, etc. are the information contained in the response from the server 104.

Figure 6:
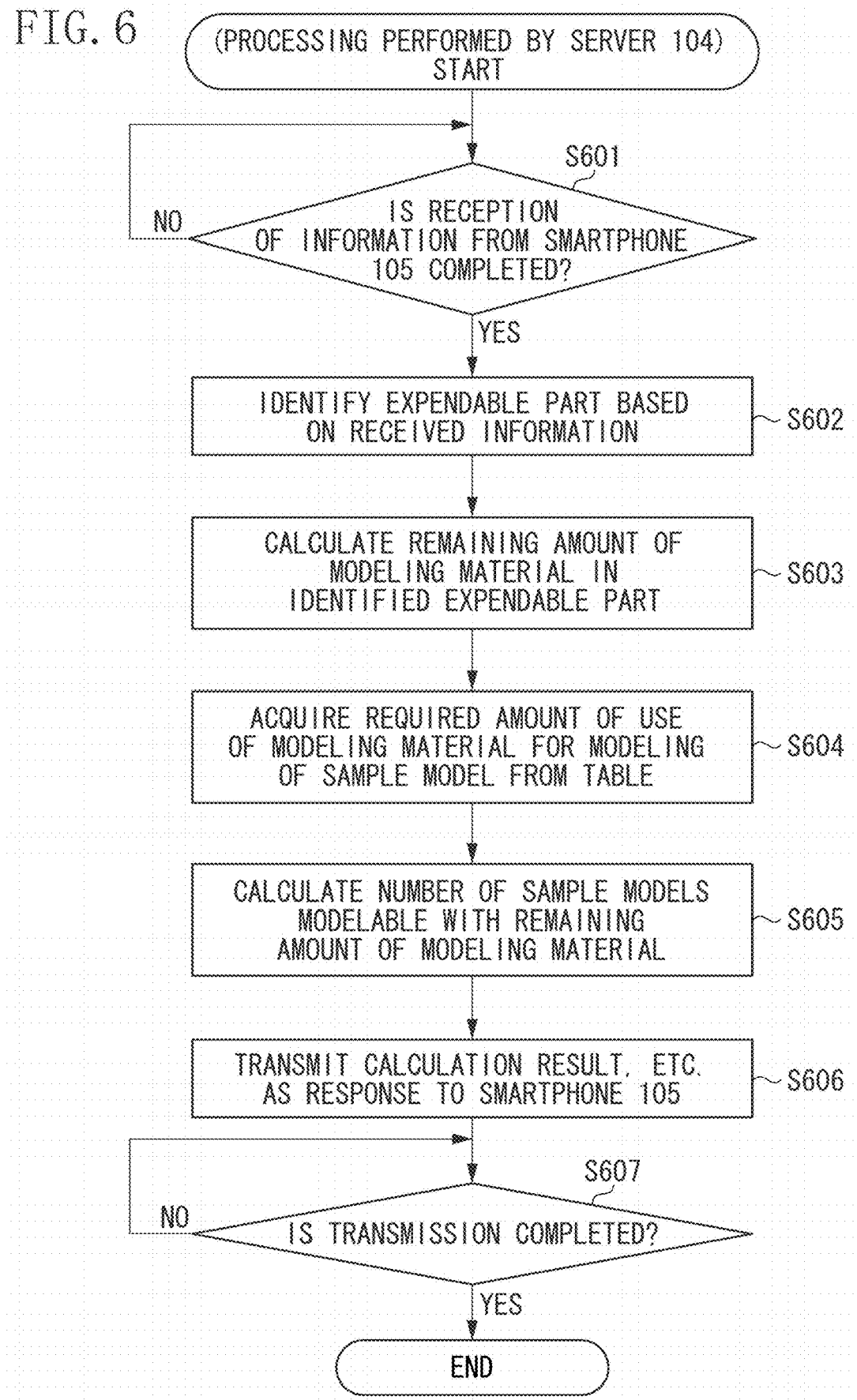
FIG. 6 is a flow chart illustrating an example of a process performed by a server.

FIG. 6 is a flow chart illustrating an example of a process performed by the server 104.

In step S601, the server 104 determines whether the reception of information from the smartphone 105 is completed. If the reception of information from the application is completed (YES in step S601), the processing proceeds to step S602.

In step S602, the server 104 identifies the expendable part 301 to be processed, based on information about the expendable part manufacturer, the basic material and color of the modeling material, and model number, etc. contained in the information received from the smartphone 105. Through the processing performed in step S602, information about the amount of the modeling material provided in the identified expendable part 301 before use is acquired. For example, a table in FIG. 9 which stores manufactures and model numbers of expendable parts and the amount of the modeling material included in each new expendable part, is referenced. The server 104 references the table illustrated in FIG. 9 using the manufacturer and model number of the expendable part as identification information about the expendable part to acquire the amount of the modeling material provided in the corresponding expendable part before use.

Referring back to the flow chart illustrated in FIG. 6, next in step S603, the server 104 calculates the amount of the modeling material remaining in the expendable part 301. The server 104 can calculate the amount of the modeling material remaining in the expendable part 301 by subtracting the cumulative used amount indicated in the information received from the smartphone 105 in step S601 from the amount of the modeling material provided in the new expendable part 301 that is acquired in step S602.

More specifically, the server 104 identifies the XYZ company as the manufacturer of the expendable part 301 and LMN as the model number of the expendable part 301 from the information received from the application in step S601. Accordingly, based on the table in FIG. 9, it is determined that the amount of the modeling material for the new expendable part 301 is 10000 mm. Further, from the information received from the application in step S601, it is determined that the cumulative use amount of the modeling material in the expendable part 301 is 5500 mm, so that it can be calculated that the amount of the modeling material remaining in the expendable part 301 is 4500 mm.

In a case where the information received from the smartphone 105 contains information about the remaining amount of the modeling material, steps S602 and S603 are skipped.

Next, the server 104 calculates the number of the sample models modelable using the amount of the modeling material remaining in the identified expendable part.

First, in step S604, a coefficient required for the calculation is acquired from a table illustrated in FIG. 10 or 11. The coefficient refers to an assumed use amount of modeling material required for the modeling of a sample model.

Further, while the amount of the modeling material is specified in millimeters (mm) in the present exemplary embodiment, another unit such as milligrams (mg) may be used. Further, in a case where the sample model is "sample model 1" and the printer model is "model B," the server 104 acquires the coefficient required for the calculation from a table 1002 in FIG. 10. Further, in a case where the sample model is "sample model 2" and the printer model is "model A," the server 104 acquires the coefficient required for the calculation from a table 1101 in FIG. 11.

Thus, a table for each printer type with respect to the corresponding sample model type is stored on the server 104. A table for each printer type needs to be stored because the amount of the modeling material required for the modeling of an object varies depending on properties of the print heads, etc. of the printers even if objects have the same shape and volume.

Alternatively, calculation formulas, etc. may be stored on the server 104 instead of the tables for the calculation of the amount of the modeling material required for the modeling of the sample model.

In the present exemplary embodiment, the information received from the smartphone 105 in step S601 specifies that the 3D printer model is "model B of XYZ company" and the sample model is "sample model 1," so that the coefficient is acquired from the table 1101 in FIG. 11.

Further, since the modeling material type received from the smartphone 105 in step S601 is PLA, the amount of the modeling material required for the modeling is acquired from the column of PLA in the table 1101 in FIG. 11.

As described above, in the case where, for example, the size is "large," the coefficient acquired in step S604 in the present exemplary embodiment is 1000 mm for the filling rate of 100%, 500 mm for the filling rate of 50%, and 200 mm for the filling rate of 20%.

Referring back to the flow chart illustrated in FIG. 6, in step S605, the server 104 calculates the number of the sample models 1 that can be modeled, based on the amount of the modeling material remaining in the expendable part 301 that is calculated in step S603 and the coefficient acquired in step S604.

More specifically, the amount of the modeling material remaining in the expendable part 301 calculated in step S603 is 4500 mm, so that, if the size corresponds to "large" and the filling rate is "100%," the number of the sample models 1 that can be modeled is calculated to be four. Similarly, the server 104 calculates the number of the sample models modelable for each size and each filling rate.

Next, in step S606, the server 104 transmits the calculation result obtained in step S605 as a response to the smartphone 105. At this time, the server 104 may also transmit an image of the sample model 1 regarding each filling rate together with the calculation result. The information 407 in FIG. 4 indicates details of the data transmitted to the smartphone 105 in step S606. Further, the image transmitted by the server 104 is used in the screen UIs 807 and 808 in FIGS. 8A and 8B, respectively.

Next, in step S607, the server 104 waits for completion of the transmission of the calculation result and the image. When the transmission is completed (YES in step S607), the process is ended.

Alternatively, the server 104 may transmit as a response to the smartphone 105 a table or a calculation formula used for the calculation of the amount of the modeling material required for the modeling of the sample model. In this case, the smartphone 105 calculates the number of the sample models modelable.

Further, information about the remaining amount of the modeling material or the amount of the modeling material already used may be managed by the server 104 without being stored on the IC chip 304 of the expendable part 301. In this case, the smartphone 105 uses the expendable part identification information stored on the IC chip 304 of the expendable part 301 at the time of communicating with the server 104.

Further, a function and data required for execution of the process to be performed by the server 104 described above may be included in the application installed in the smartphone 105. In this case, the smartphone 105 can display, without communicating with the server 104, the number of objects modelable by the control apparatus with the amount of the modeling material remaining in the expendable part 301 and information specifying the shape and size of the object.

In the present exemplary embodiment, the configuration for displaying on the screen of the smartphone 105 the number of objects modelable with the amount of the modeling material remaining in the expendable part 301 and information specifying the shape and size of the object has been described. The configuration makes it easy for the user to intuitively recognize an object(s) that can be modeled with the amount of the modeling material remaining in the expendable part 301.

In the first exemplary embodiment, the smartphone 105 receives designation of a sample model from a user when the user checks expendable part information read and acquired from the IC chip. In a second exemplary embodiment, the user registers a designated sample model in advance in the server 104. In this way, the user does not have to designate a sample model each time the user reads information from an expendable part, so that the time required for the user operations can be reduced.

Figure 12:
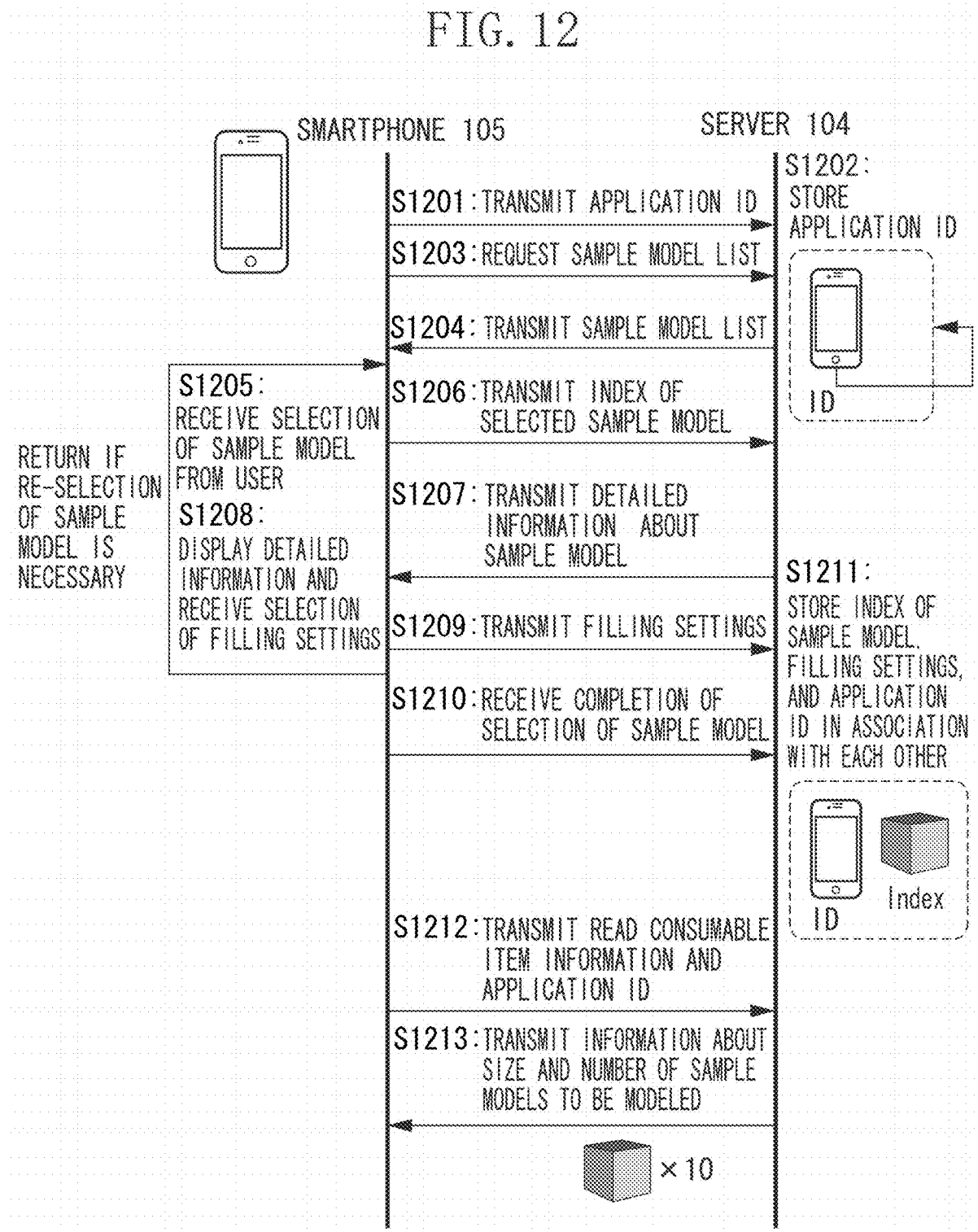
FIG. 12 is a sequence diagram illustrating an example of data communication between a smartphone and a server according to a second exemplary embodiment.

FIG. 12 is a sequence diagram illustrating an example of communication between the smartphone 105 and the server 104.

First, in step S1201, the application of the smartphone 105 transmits an application identifier (ID) to the server 104. In the present exemplary embodiment, the application ID refers to an identifier for the identification of the smartphone 105 by the server 104 when the server 104 communicates with the smartphone 105. Alternatively, the application ID may be an identifier for the identification of a user logging in into the application.

In step S1202, the server 104 stores the application ID received from the smartphone 105 on the ROM 204 or the secondary storage device 206 in the server 104 or an external storage device (not illustrated).

Next, in step S1203, the smartphone 105 requests the server 104 to transmit a sample model list.

In step S1204, the server 104 transmits the sample model list to the smartphone 105 in response to the request. The smartphone 105 displays a screen UI as illustrated in FIG. 13 on the screen of the smartphone 105, and receives selection of a sample model from the user.

Figure 13:
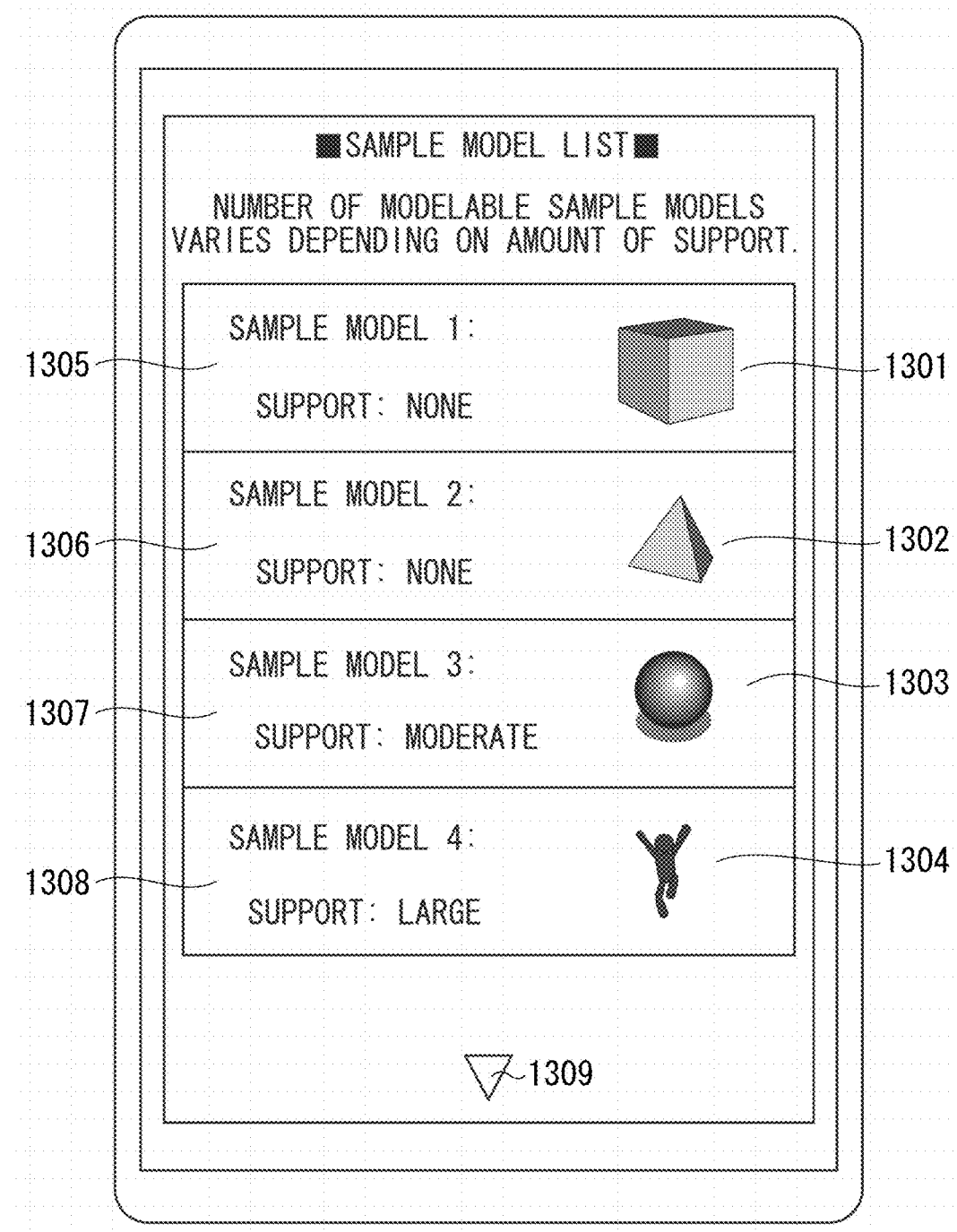
FIG. 13 illustrates an example of a display screen UI of a smartphone.

The display screen UI illustrated in FIG. 13 is described below.

The sample model list acquired from the server 104 includes icons 1301 to 1304 indicating images of sample models and messages 1305 to 1308 about the respective sample models. In FIG. 13, the messages include information about a support structure that is modeled as needed as a support in the modeling of the object. The information about the support structure includes information about the presence/absence of a support and the amount of the support. In a case of a sample model that needs a support, the amount of the modeling material required for the modeling of the sample model that is specified in FIGS. 10 and 11 includes the amount of the modeling material required for the modeling of the support.

On the server 104, the name, image, and message for each sample model displayed in the sample model list are managed in association with an index as an identifier of the sample model. For example, information about a sample model specified by index=1 includes the sample model name "sample model 1" (in the first line of the list illustrated in FIG. 13), an image specified by the icon 1301 (cubic icon), and the message 1305 "support: none". The foregoing information is displayed on the screen of the smartphone 105. As illustrated in FIG. 13, the plurality of objects displayed as sample model candidates includes objects different in the amount of the modeling material for the support.

Further, there may be a case where the number of sample models included in the sample model list exceeds the number of sample models that can be concurrently displayed on the screen of the smartphone 105. In such a case, the screen of the smartphone 105 is moved longitudinally or laterally to display a sample model included in the list. A downward icon 1309 in FIG. 13 indicates that the screen can be moved longitudinally.

Referring back to FIG. 12, there may be a case where the sample model list transmitted from the server 104 in step S1204 is a part of an entire sample model list. In such a case, the smartphone 105 executes processing to sequentially receive the sample model list from the server 104.

Next, in step S1205, the smartphone 105 receives selection of a sample model from the user. Then, in step S1206, the smartphone 105 transmits to the server 104 the index of the sample model selected by the user.

Figure 14:
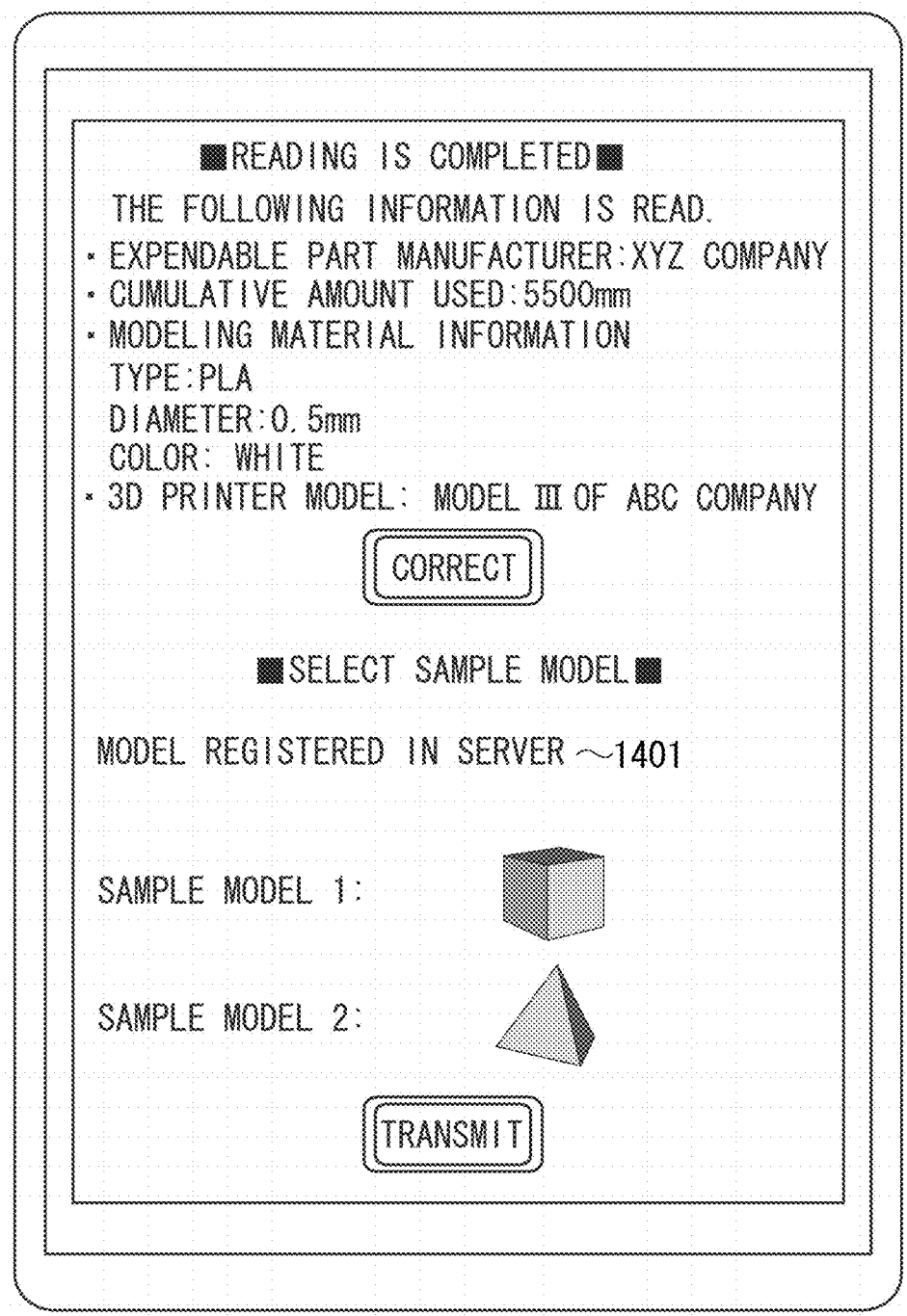
FIG. 14 illustrates an example of a display screen UI of a smartphone.

Then, in step S1207, the server 104 stores the transmitted index and transmits detailed information about the sample model corresponding to the index to the smartphone 105. As illustrated in FIG. 14, the detailed information includes a detailed image including information about the size of the sample model.

In step S1208, the smartphone 105 displays the detailed information about the sample model on the screen and receives selection of filling settings from the user. The filling settings include the filling rate and the filling pattern.

In step S1209, the smartphone 105 transmits the filling settings selected in step S1208 to the server 104.

Then, in step S1210, the smartphone 105 receives information about completion of the sample model selection as a final decision from the user. The smartphone 105 transmits information about the completion of the sample model selection to the server 104. If the user selects to change the sample model to another model in the final decision, the processing returns to step S1205, and the sample model selection is performed again.

Next, in step S1211, the server 104 stores the index of the sample model, the filling settings, and the application ID in association with each other.

By performing the foregoing processing, the user can register the sample model designated in advance in the server 104.

Then, in step S1212, the smartphone 105 transmits to the server 104 the information read from the IC chip 304 of the expendable part 301 by the operation of the user. At this time, the application ID is also transmitted. More specifically, the user performs on the screen of the smartphone 105 an operation to select an item 1401, "model registered in the server," and the "transmit" button on the screen illustrated in FIG. 14. The registration of the sample model in advance as a frequently-used sample model can reduce the time required for the user operations.

Next, the server 104 executes the process to be performed by the server 104 as illustrated in the flow chart of FIG. 6.

More specifically, the server 104 searches for information corresponding to the application ID transmitted in step S1212 from the information stored in step S1211. A sample model is determined using the index of the sample model associated with the corresponding application ID.

In step S1213, the server 104 transmits as a response to the smartphone 105 the information about the size and number of the sample models modelable with the amount of the modeling material remaining in the expendable part.

The server 104 executes the processing specified in the flow chart in FIG. 6, and steps S606 and S607 in the flow chart in FIG. 6 correspond to step S1213.

In the present exemplary embodiment, the user registers a sample model in advance in the server 104, and the user can recognize the number of the sample models modelable with the amount of the modeling material remaining in the expendable part. The user no longer needs to designate a sample model each time the user reads information from an expendable part, so that the time needed for the user operations can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225807, filed Nov. 18, 2015, which is hereby incorporated by reference herein in its entirety.

What is claimed is:

1. An information processing terminal, comprising a processor, and a memory storing an application program which, when executed by the processor, causes the information processing apparatus to:
acquire information about an expendable part containing a modeling material to be used in modeling by a control apparatus configured to model a three-dimensional object;
designate at least one of a plurality of objects, wherein shapes of the objects are different from each other or from one another; and
collectively display, based on the designated object, information about a plurality of sizes of the designated object, the sizes being different from each other or from one another, and information about the number of objects that are modelable by the control apparatus with a remaining amount of the modeling material contained in the expendable part corresponding to the acquired information about each of the sizes of the designated object.

2. The information processing terminal according to claim 1,
wherein identification information about the expendable part and information about an amount of the modeling material already used in the expendable part as the information about the expendable part are acquired, and
wherein, for displaying of the information about the number of objects, the remaining amount is obtained based on an amount of the modeling material in the expendable part, before use, identified using the acquired identification information and the amount of the modeling material already used in the expendable part.

3. The information processing terminal according to claim 1,
wherein identification information about the expendable part as the information about the expendable part is acquired, and
wherein the information about the number of objects that are modelable in the form corresponding to the designated object by the control apparatus with the remaining amount of the modeling material contained in the expendable part identified using the acquired identification information is displayed.

4. The information processing terminal according to claim 1,
wherein information about the remaining amount of the modeling material contained in the expendable part as the information about the expendable part is acquired, and
wherein the information about the number of objects that are modelable in the form corresponding to the designated object by the control apparatus with the remaining amount of the modeling material contained in the expendable part identified using the acquired information is displayed.

5. The information processing terminal according to claim 1, wherein the application program causes the information processing apparatus to receive data via a network from a management apparatus configured to manage information about a plurality of expendable parts each containing a modeling material, the data including the information about the number of objects that are modelable in the form corresponding to the designated object by the control apparatus with the remaining amount of the modeling material contained in the expendable part corresponding to the acquired information,
wherein the information about the number of the objects is displayed by using the received data.

6. The information processing terminal according to claim 1,
wherein an amount of use of the modeling material required for the modeling of the designated object includes an amount of use of the modeling material corresponding to a support structure to be modeled as needed as a support in the modeling of the object, and
wherein the plurality of shapes includes shapes of objects different in the amount of use of the modeling material corresponding to the support structure.

7. The information processing terminal according to claim 1, wherein the information about the expendable part is acquired by reading information stored in a non-volatile memory of the expendable part through contactless wireless communication.

8. A management system including an information processing terminal and a management apparatus capable of communicating with the information processing terminal, the information processing terminal comprising a processor, and a memory storing an application program which, when executed by the processor, causes the information processing apparatus to:
acquire information about an expendable part containing a modeling material to be used in modeling by a control apparatus configured to model a three-dimensional object, the information being stored in a non-volatile memory contained in the expendable part;
designate at least one of a plurality of objects, wherein shapes of the objects are different from each other or from one another;
transmit the acquired information about the expendable part to the management apparatus;
receive a response from the management apparatus;
collectively display, based on the designated object, information about a plurality of sizes of the designated object, the sizes being different from each other or from one another, and information about the number of objects that are moldable by the control apparatus with a remaining amount of the modeling material contained in the expendable part, and
the management apparatus comprising a processor, and a memory storing an application program which, when executed by the processor, causes the information processing apparatus to:
receive the information about the expendable part from the information processing terminal;
calculate, based on the received information, the number of objects that are modelable by the control apparatus with the remaining amount of the modeling material contained in the expendable part corresponding to the acquired information about each of the sizes of the designated object; and
transmit to the information processing terminal a response including the calculated number.

9. A method for controlling an information processing terminal, the method comprising:
acquiring information about a expendable part containing a modeling material to be used in modeling by a control apparatus configured to model a three-dimensional object;

designating at least one of a plurality of objects, wherein shapes of the objects are different from each other or from one another;

collectively displaying, based on the designated object, information about a plurality of sizes of the designated object, the sizes being different from each other or from one another, and information about the number of objects that are modelable by the control apparatus with a remaining amount of the modeling material of an expendable part corresponding to the acquired information about each of the sizes of the designated object.

10. A non-transitory recording medium storing a control program causing a computer to perform each step of a control method of an information processing terminal, the method comprising:

acquiring information about a expendable part containing a modeling material to be used in modeling by a control apparatus configured to model a three-dimensional object;

designating at least one of a plurality of objects, wherein shapes of the objects are different from each other or from one another;

collectively displaying, based on the designated object, information about a plurality of sizes of the designated object, the sizes being different from each other or from one another, and information about the number of objects that are moldable by the control apparatus with a remaining amount of the modeling material of an expendable part corresponding to the acquired information about each of the sizes of the designated object.

11. An information processing terminal, comprising a processor, and a memory storing an application program which, when executed by the processor, causes the information processing apparatus to:

acquire information about an expendable part containing a modeling material to be used in modeling by a control apparatus configured to model a three-dimensional object;

designate at least one of a plurality of objects, wherein shapes of the objects are different from each other or from one another; and display, based on the designated object, information about a plurality of sizes of the designated object, the sizes being different from each other or from one another, and information about the number of objects that are modelable by the control apparatus with a remaining amount of the modeling material contained in the expendable part corresponding to the acquired information about each of the sizes of the designated object; and change an internal structure of the designated object, wherein the information, about the number of objects that are modelable by the changed internal structure of the designated object by the control apparatus with the remaining amount of the modeling material contained in the expendable part corresponding to the acquired information about each of the sizes of the designated object, is displayed.

* * * * *